United States Patent
Kortschack et al.

(10) Patent No.: US 10,893,681 B2
(45) Date of Patent: Jan. 19, 2021

(54) METHOD FOR TREATING FOOD WHICH IS IN AN INSULATING ENCAPSULATION OR CASING OR WHICH WILL BE INTRODUCED INTO SAME, USING NON-CONVENTIONAL OHMIC HEATING

(71) Applicant: Fritz Kortschack, Oldenburg (DE)

(72) Inventors: Fritz Kortschack, Oldenburg (DE); Kevin Eberhardt, Sachsen bei Ansbach (DE)

(73) Assignee: Fritz Kortschack, Oldenburg (DE)

( * ) Notice: Subject to any disclaimer, the term of this patent is extended or adjusted under 35 U.S.C. 154(b) by 0 days.

(21) Appl. No.: 16/343,628

(22) PCT Filed: Nov. 16, 2017

(86) PCT No.: PCT/EP2017/079373
§ 371 (c)(1),
(2) Date: Apr. 19, 2019

(87) PCT Pub. No.: WO2018/091557
PCT Pub. Date: May 24, 2018

(65) Prior Publication Data
US 2019/0327983 A1    Oct. 31, 2019

(30) Foreign Application Priority Data

Nov. 21, 2016 (DE) .......................... 10 2016 122 395
Nov. 15, 2017 (DE) .......................... 10 2017 126 800

(51) Int. Cl.
*A22C 11/00* (2006.01)
*A23L 3/02* (2006.01)
(Continued)

(52) U.S. Cl.
CPC .......... *A22C 11/00* (2013.01); *A22C 13/0026* (2013.01); *A23L 3/02* (2013.01);
(Continued)

(58) Field of Classification Search
CPC ... A22C 11/00; A23L 3/02; A23L 5/15; A23L 5/30; A23L 13/65
(Continued)

(56) References Cited

U.S. PATENT DOCUMENTS 3,009,813 A * 11/1961 Neumann ............ H05B 3/0004
426/246
3,886,290 A     5/1975 Theimer et al. ............... 426/107
(Continued)

FOREIGN PATENT DOCUMENTS

DE         1540909 A1    11/1970    ............... H05B 3/00
DE    102014010166 A1     2/2015    ............... A22C 11/00
(Continued)

OTHER PUBLICATIONS

Notification Concerning Transmittal of Copy of International Preliminary Report on Patentability (Chapter I of the Patent Cooperation Treaty), in English, dated May 31, 2019, which was issued by the International Bureau of WIPO in Applicant's corresponding international PCT application having Serial No. PCT/EP2017/079373, filed on Nov. 16, 2017.
(Continued)

*Primary Examiner* — David J Parsley
(74) *Attorney, Agent, or Firm* — Bodner & O'Rourke, LLP; Gerald T. Bodner; Christian P. Bodner

(57) ABSTRACT

A method for treating a food which is in an insulating encapsulation or casing or which will be introduced into same, by ohmic heating. The heating serves to treat sausage products in an intestine, such as Brühwurst (scalded sausage), hot dogs or similar food products. The food is brought into contact with spaced electrically conductive electrodes, wherein the electrodes are connected to a controllable power source. The electrodes are each in the form of at least one first and one second electrode group, wherein the electrode
(Continued)

Figure 1:
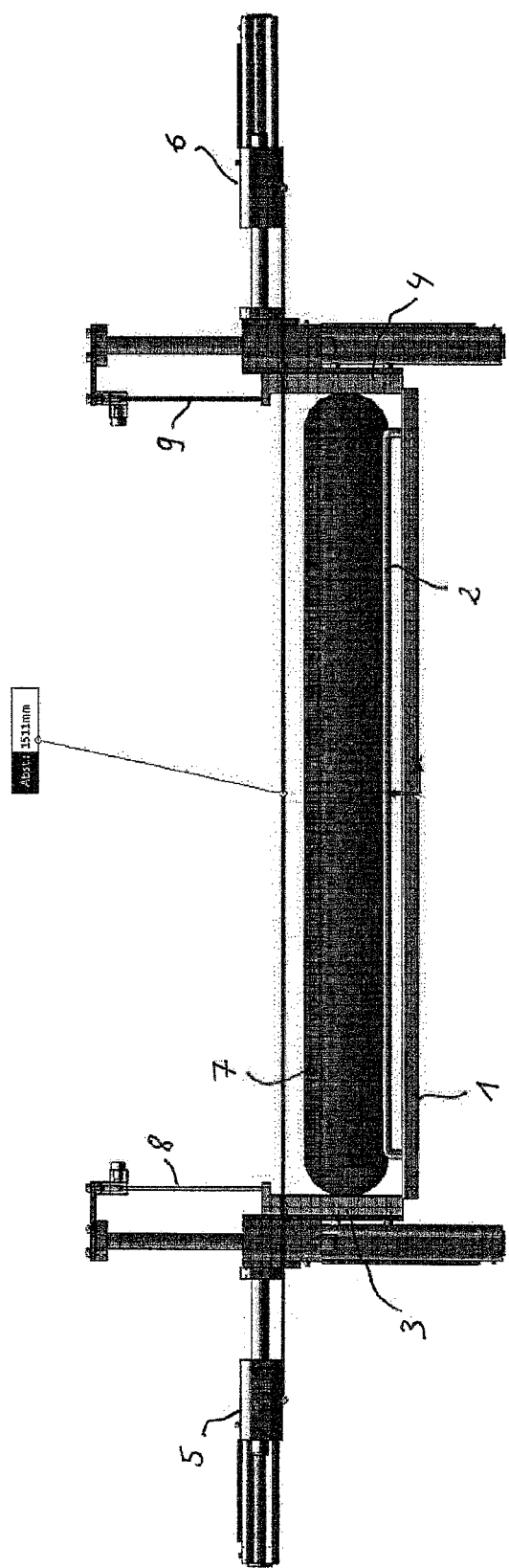

groups are at a distance $A_{EG}$ to one another. Each electrode group has a number of individual electrodes, similar to a comb-like set of needles, wherein the neighbouring individual electrodes of the comb-type set of needles are each at a distance $A_{EE}$ to one another. The respective comb-like set of needles penetrates the insulating encapsulation or the casing of the food.

24 Claims, 6 Drawing Sheets

(51) Int. Cl.
| | | |
|---|---|---|
| *A23L 5/30* | (2016.01) | |
| *A23L 13/60* | (2016.01) | |
| *A23L 5/10* | (2016.01) | |
| *A22C 13/00* | (2006.01) | |
| *B65D 81/34* | (2006.01) | |
| *H05B 3/00* | (2006.01) | |

(52) U.S. Cl.
CPC ............... *A23L 5/15* (2016.08); *A23L 5/30* (2016.08); *A23L 13/65* (2016.08); *B65D 81/3476* (2013.01); *H05B 3/0004* (2013.01); *A23V 2002/00* (2013.01)

(58) Field of Classification Search
USPC ........................................ 452/30, 31; 99/358
See application file for complete search history.

(56) References Cited

U.S. PATENT DOCUMENTS

| | | | | |
|---|---|---|---|---|
| 4,974,503 | A * | 12/1990 | Koch .................. | A23L 3/01 |
| | | | | 219/771 |
| 8,487,222 | B2 * | 7/2013 | Yamada .................. | A23L 3/10 |
| | | | | 219/388 |
| 2016/0183543 | A1 * | 6/2016 | Kortschack .............. | A23L 5/15 |
| | | | | 426/234 |

FOREIGN PATENT DOCUMENTS

| | | | |
|---|---|---|---|
| DE | 102015206385 A1 | 10/2016 | ............... A23L 5/10 |
| EP | 2175693 A1 | 4/2010 | ............... A23L 5/10 |
| EP | 2871914 A1 | 5/2015 | ............... H05B 3/00 |
| WO | WO2015022189 A2 | 2/2015 | ............ A22C 11/00 |

OTHER PUBLICATIONS

English translation of the International Preliminary Report on Patentability (Chapter I of the Patent Cooperation Treaty), dated May 21, 2019, which was issued by the International Bureau of WIPO in Applicant's corresponding international PCT application having Serial No. PCT/EP2017/079373, filed on Nov. 16, 2017.

Written Opinion of the International Searching Authority, in English, dated Feb. 21, 2018, which was issued by the International Bureau of WIPO in Applicant's corresponding international PCT application having Serial No. PCT/EP2017/079373, filed on Nov. 16, 2017.

International Search Report, in English, dated Feb. 21, 2018, which was issued by the International Bureau of WIPO in Applicant's corresponding international PCT application having Serial No. PCT/EP2017/079373, filed on Nov. 16, 2017.

* cited by examiner

METHOD FOR TREATING FOOD WHICH IS IN AN INSULATING ENCAPSULATION OR CASING OR WHICH WILL BE INTRODUCED INTO SAME, USING NON-CONVENTIONAL OHMIC HEATING

The invention relates to a method for treating food which is in an insulating encapsulation or casing or which will be introduced into same, by means of non-conventional ohmic heating, for heating a sausage product such as scalded sausage, hot dogs or similar products present in a casing, wherein the respective food is brought into contact with spaced electrically conductive electrodes, and the electrodes are connected to a controllable or regulatable current source according to the preamble of claim 1.

From DE 1 540 909 A, a device for rapid electrical heating of food is already known, wherein the heating is performed by an axial passage of high-frequency alternating current. The alternating current is fed via contacts at the ends or front sides of the elongated food to be treated. The related non-conducting or poorly conducting casing of the food is penetrated. At the contact surfaces, the employed electrodes may have point-shaped or cutting edge-shaped protrusions so that the above-mentioned casing may be pierced more easily.

The device for heating food according to DE 10 2015 206 385 A1 preferably is for treating enclosed products, in particular meat and sausage products. By means of the already known teaching, a rapid heating of the enclosed food is intended to be realized by uniformly applying electric current which generates heat within the food.

In this respect, the device features at least two spaced-apart, axially parallel and co-rotatable cylindrical electrodes which are electrically coupled to the terminals of opposite polarity of an electrical current source and are in electrical contact with the envelope, wherein the electrodes rotate at the casing. Preferably, the envelope features a longitudinal axis arranged in parallel to the longitudinal axes of the electrodes so that the at least two electrodes rotate axially parallel to the envelope.

The current source according to DE 10 2015 206-385 A1 provides alternating current having a frequency in the range of 2 kHz to 300 MHz.

The generic DE 10 2014 010 166 A1 relates to a method for treating a foodstuff by heating. In this case, a non-conventional ohmic heating is used. The functional principle of the ohmic heating is based on directly passing current through the product. The foodstuff thereby virtually assumes the function of a resistor.

In the method according to DE 10 2014 010 166 A1, an envelope that is dimensionally stable or can be dimensionally stabilized by further means and is made of a non-conducting material is first filled with a filling material. This may in particular be sausage meat or a similar raw food material. Subsequently, the openings of the envelope are closed by means of conducting surfaces, in particular plates or plugs. The electrical current is supplied via the conducting surfaces for the purpose of ohmic heating.

In a design of the teaching therein, there is the option of performing the current application to the material to be treated in intervals. Accordingly, an energizing interval is followed by a rest interval for equalizing the temperature in the product. The respective period of time of the intervals may be selected based on the respective product properties, for example, the heat conductivity or electrical conductivity.

In a design according to DE 10 2014 010 166 A1, the material to be treated may be divided into sections within the envelope by conducting delimitations, for example, discs made of a conducting material.

These conductive delimitations result in the current flow to be homogenized and thus the ohmic heating to be equalized. A product that has been heated in such a way may be easily withdrawn from the dimensionally stable envelope and cut into slices in a simple manner.

Raw sausage mass which is filled into corresponding cartridges even in a very cold state may be permanently further compacted by closures and by pressure.

The mentioned dimensionally stable envelope may at the same time be utilized as a contamination-free package, in particular transport package for the final product.

Although the methods described above already show very good results in treating foodstuffs by ohmic heating, there is the problem that in particular in case of large-surface contacts air inclusions will build up during the heating process or gases are released during heating which form an insulating layer immediately in front of the contact surface so that the heating is irregular, which might result in disturbances of the production flow in producing corresponding foodstuffs. Even though this effect may be reduced by means of the idea of creating a relative movement between the filling material, that is the foodstuff to be treated and the conducting surfaces, the expenditure for creating such a relative movement, however, is considerable.

From the aforementioned, it is therefore a task of the invention to propose a further developed method for treating a foodstuff which is in an insulating encapsulation or casing or which will be introduced into same, by means of ohmic heating, which method does no longer have the depicted disadvantages of the prior art and is suitable for industrial production.

The task of the invention is solved by a method according to the teaching as per claim 1, wherein the dependent claims comprise at least appropriate configurations and further developments.

The method according to the invention is based on ohmic heating that is known per se and relates to foodstuffs present in an insulating encapsulation or casing. The casing may be a natural casing, for example. The insulating encapsulation may comprise individual shaped trays, groups of shaped trays, cylindrical shells or other shell configurations of arbitrary cross-section.

The foodstuffs to be treated are in particular sausage products such as scalded sausage, hot dogs or similar products. Basically, however, other foodstuffs such as pork belly, boiled ham, cured pork, meat preparations or similar may also be treated by means of the method according to the invention.

For the respective method, the electrodes each are formed as at least one first and one second electrode group.

The electrode groups are at a distance $A_{EG}$ to one another.

On the other hand, each electrode group has a number of individual electrodes, similar to a comb-like set of needles, wherein the neighboring individual electrodes of the comb-type set of needles are each at a distance $A_{EE}$ to one another.

The distance $A_{EG}$ is in this case greater than or maximally equal to the distance $A_{EE}$.

The respective comb-like set of needles penetrates the insulating encapsulation or casing and pierces the foodstuff in such a way that entry, docking or exit points are formed in relation to the foodstuff and the encapsulation or casing.

The individual electrodes of the comb-like set of needles or of the electrode of the comb-like set of needles are realized to be substantially in parallel to one another. Each electrode has a puncture sharpening. This may be, for example, a corresponding grinding. However, it is also possible for the electrodes with rounded or flattened ends to be introduced by means of a placeholder, e.g. a ground small tube, into the envelope and through the material to be treated up to the opposite casing wall, wherein it must be guaranteed for the ends of the electrodes to rest flush against the opposite inner wall of the envelope.

According to the invention, the current source is only activated when all of or the vast majority of the individual electrodes have reached their (exit point) end position, that is, when the foodstuff has been completely pierced.

In case of a sausage product present in a flexible natural casing, the respective electrode groups preferably are entered in the tail area of the natural casing, and a corresponding puncture is produced there, wherein an at least end-side compaction of the sausage product occurs by means of exerting a pressing force in the longitudinal direction of the sausage product, and an undesired cap formation at the natural casing ends is avoided.

After the removal of the respective electrode groups from the treated foodstuff by the action of tensile or compressive force, the remaining entry or passage points at the natural casing or envelope are closed.

This closing may be performed, for example, by spraying with a food grade fluid plastic, by gluing, coating or by applying a coating-like enclosing.

For the purpose of closing, re-stretching, self-repairing film materials are particularly suitable. In this case, the material of the artificial casing may already be composed of such a self-repairing film material or have self-repairing properties in the areas where the piercing should take place.

The current source for generating electrical energy which had been mentioned at the beginning provides high-frequency energy. The controllability of the energy source ensures that no undesired hot spots will develop in the foodstuff during the ohmic heating, with a pulse-like current application at a controlled observation of a maximum intensity of current being likewise possible.

After the ohmic heating and for the purpose of further decontaminating, there is the possibility for the corresponding product to be reheated in a conventional way, for example, by realizing a water bath or performing a treatment with hot steam. As a complement, a treatment by means of infrared radiation may likewise be realized.

In a further development of the invention, the individual electrodes are configured to be rotatable or movable about their axes. During the piercing process, the individual electrodes may execute a rotational movement, wherein a rotational movement at a respectively changed direction taking place during the removal of the individual electrodes. Through this piercing by means of a rotational movement, the entry or piercing point is realized to be minimally invasive with respect to the envelope so that the expenditure in reclosing is reduced.

In further developing the invention, the individual electrodes may be realized as hollow electrodes. The space of the hollow electrode may then serve the purpose of accommodating a heating or cooling agent or have a heating core or cooling core of high thermal conductivity. At least one of the electrodes may comprise an integrated temperature sensor.

The insulated encapsulation may be configured to be rigid. In this case, the encapsulation has openings in its areas of the longitudinal end, through which the individual electrodes may penetrate and get into contact with the material of foodstuff to be treated.

It should be noted at this point that the introduction of the electrodes with respect to an elongated material to be treated, for example, a hot dog, is performed substantially oblique or even perpendicular to the longitudinal axis of the material to be treated.

In further developing the invention, the individual electrodes may be inserted such that in at least one electrode group a so-called grid electrode is formed. This means that a first electrode comb is entered into the foodstuff and its envelope. A second electrode comb is then also entered at the same site, but at an angular offset. If the developed structure is then analyzed in an imaginary viewing direction perpendicular to the entry direction, the structure represents itself as a grid electrode.

In a further development of the invention, the insulating encapsulation may be composed of (half) shells receiving the foodstuff, wherein the (half) shells will be moved toward one another to constitute a mold prior to the penetration of the electrodes with respect to the foodstuff. This movement toward one another allows the foodstuff to be molded and compacted. It is not necessary for the foodstuff to be supplied to the shells in an envelope, rather the material may also be molded and compacted in the shells in the form of a mass before the ohmic heating takes place via the (piercing) entry electrodes. Possible air inclusions may be removed, for which purpose the openings for piercing situated at the opposite ends of the half shells may be utilized.

In a design of the invention, there is the option for the penetrating or piercing of the foodstuff or the envelope of the foodstuff to be performed in an ultrasonic-assisted manner.

A further development of the teaching according to the invention is the idea of using a continuous or line production. In this respect, a mechanical separation device similar to a knife, which cuts through a volume strand of the material to be treated, may be attached to the end of the mentioned dimensionally stable envelope, which is cartridge-like.

Such a separation device which consists of a conductive material or has a conductive coating then serves at the same time as a contact and spatial delimitation for the respective material to be treated which has not yet been heat-treated.

The very material to be treated is introduced as an endless flow into the dimensionally stable envelope via a filling device. Once the material to be treated, which has not yet been heated by the heating according to the explained method, has reached the point where the separation device separates or should cut-off the heat-treated material from the untreated material, the separation device is lowered, that means is moved toward the material to be treated, wherein the opening of the dimensionally stable envelope is covered over the entire surface by the separation device which constitutes a contact surface.

Here, the feed pressure applied by the filling device is preferably maintained.

A counter contact in the form of the comb-like set of needles according to the invention pierces the envelope before or through the entry opening and thus penetrates into and through the material to be treated. The subsequent ohmic heating causes the necessary heating to take place between the closed current-conducting separation device and the comb-like set of needles. The applied feed pressure prevents the material to be treated to expand too much during the heating, and thus the consistency of the final product to adversely affected.

After the executed treatment, the separation device and the comb-like set of needles are removed from the opening of the dimensionally stable envelope, and the heat-treated material is conveyed out thus far that the penetration openings are positioned directly below the area of the blades of the separation device. When this position is reached, the filling pressure will be shortly interrupted until the opening is closed again by the separation device. In parallel with or following this, the comb-like set of needles is guided through the material to be treated and the filling pressure upon the material to be treated is activated for reaching the required consistency. The heated material to be treated subsequently may be put into a mold or provided with a protective envelope and, if need be, subjected to further treatments, for example, a treatment with liquid smoke or flavors.

According to a further inventive idea, there is the option of partially heating the material to be treated.

Using the entry electrodes, in particular in the form of a comb-like set of needles, parts of a larger material to be treated may be heated in a targeted manner.

If, for example, only the center piece of a loin should be heated, piercing electrodes may be positioned behind des neck area and further ones in front of the fillet piece.

In such a solution, the solution may even be realized such that a fixed contact surface is provided, and a material of arbitrary length is brought into connection with this contact via a corresponding front side. If the piercing electrode is introduced into the material to be treated at a distance from the frontal contact and the current source is activated, only that part of the material will be heated which is between the electrodes.

The manner briefly explained above, for example, allows fresh pieces of meat to be partially heated. In this case, the selected temperatures may be set from very mild, for example 40° C., up to the range of higher temperatures, for example >100° C. In doing so, it turned out to be particularly advantageous that an inactivation of microorganisms occurs in the course of ohmic heating already at lower treatment temperatures as compared to conventional heating.

In case of a material to be treated which has a very irregular shape, for example, peeled tongues, the material to be treated may be introduced into a liquid or gelatinous medium, wherein this medium has a settable electrical resistance. Preferentially, the resistance of the medium will be set to the actual resistance of the material to be treated. The thus prepared material to be treated may then in turn be introduced into shaping envelopes and subjected to the desired ohmic heating.

Irrespective of the advantages according to the method, inhomogeneities in heating the material to be treated may lead to high local or low local temperatures (hot spots, cold spots). During the ohmic heating, inhomogeneities including the hot spots or cold spots mentioned above will develop due to different electrical conductivities of single product sections or due to an irregular distribution of the electric field. Especially, disperse systems having aqueous or oily or particulate fractions feature differences in conductivity, which result in differences in the temperature increase of the respective phase.

To tackle these issues, the invention proposes to divide the process of heating into sections or temporal blocks so that cold spots or hot spots that have possibly formed can adapt to one another. Thus, it is possible for a pulse heating to be performed up, for example, to 50° C. of the material to be treated. Thereafter, the energizing is interrupted so that the protein network may form firmer structures. In the next step, a heating up to about 60° C. is performed. During another treatment break, the protein network will acquire higher stability. Following this, a further heat treatment up to the desired final temperature is performed. The perforating or destroying of cell membranes during the ohmic heating results in a combination of intracellular fluid and extracellular fluids. This results in higher water-binding capacity with the effect of reduced jelly deposits. Hereby, in turn, the survival rate of microorganisms is reduced due to the damage of cell membranes, which is advantageous for the shelf life of the thus treated foodstuff.

A further advantage of interrupting the heating at a relatively low temperature as explained above is the fact that the gas present in the material to be treated, for example sausage meat, especially under counter-pressure, does not yet expand at about 50° C. so much that the slowly solidifying protein matrix is torn. As already exposed, the protein network, promoted by the reached temperature, may further solidify, that is to say coagulate, during the treatment breaks. During the subsequent further temperature treatment, the trapped gas is kept fixed in its initial position. When the heating is too rapid, the trapped gas, however, may expand explosively and/or combine with other gases before the protein matrix is sufficiently and firmly solidified. Hereby, greater air inclusions develop having corresponding disadvantages for the material to be treated.

The degree of dryness is also reduced in the area of edge zones of the material to be treated by the stepwise treatment.

A further aspect of the invention is that in case of sheathing a product, for example, by means of a natural casing or a water-permeable and current-permeable envelope, for example, raw sausage meat in a sausage skin is introduced into a water-permeable and current-permeable mold or membrane. When put into this mold or membrane, the mold or membrane will be contacted by (immersed in) a resistance-adjusted fluid or gelatinous mass. The fluid at or around the enveloped sausage meat may then be heated according to the invention by opposite electrodes.

Hereby, it is possible for semi-finished products to be positioned between the contacts virtually floating for heating, or if semi-finished product chains are concerned, to be continuously pulled through, also in the resistance bath, between the contacts for heating. After the heating, the product chains, for example single frying sausages, may be separated and packaged. If a smoking process is required for finishing, for example, of a wiener, then the casing may be dried so far that the drying is irreversible and a later water intake may no longer occur. The step mentioned last results in an advantageous manner in the casing not seeming to be tough. By smoke treatment or liquid smoke, for example, the desired coloring or flavoring may then be performed in further steps.

If in treating the material, a shrinkage of the casings employed as envelopes happens to be insufficient, there is the possibility for the not yet treated but filled casing to be clamped in between two or more half shells or quarter shells. The ends of the half shells or quarter shells then have holes through which the comb electrodes or penetration electrodes may be introduced. An additional plug with correspondingly configured recesses exactly matched to the entry openings in the half shells when in the final position, is capable of increasing the pressure upon the material to be treated so as to reduce possibly existing hollow spaces. After completion of the ohmic heating according to the invention, the sausage meat is then solidified to an extent that the heated product, after opening of the half shells and quarter shells, may be withdrawn and post-treated in a known manner. This ensures that even very priceworthy artificial casings may be used for enveloping. If electrodes are applied which are capable of accommodating an integrated temperature sensor, the heating during the heating process may be determined, the core temperature may be identified and referred to as a control variable.

Quite basically, the solution according to the invention may also be utilized for treating raw sausage meats in cartridges when the possibility of introducing the electrodes according to the invention is given.

For designing ends or caps, resistance-adjusted fluids, gelatinous masses or substances (buffer material) having these properties may be positioned in front of the electrodes. A water-permeable or current-permeable mold or membrane is introduced in between the material to be treated and heated and the buffer material, which mold or membrane ensures that the product ends assume the desired shape. This device enables that the energization of the material to be treated will be uniform even at convexities and that the desired geometries are realized.

The material for the electrodes or electrode groups must comply with the relevant provisions of food technology and should be easy to clean. For avoiding contaminations, there is the option for the electrodes to be provided with an antibacterial coating. This may be, for example, a coating comprising silver ions or releasing silver ions.

Alternatively, there is the option for the electrodes to be manufactured at least in part from a plastic material, with the plastic material having an adjustable electrical conductivity. This allows the current flow across the imaginary plane spanned by the individual electrodes to be predefined. A consequence hereof is a uniform improved heating, in particular in the edge areas of a sausage-shaped material to be treated.

The invention will be explained in more detail below based on an exemplary embodiment and with reference to Figures.

Figure 2:
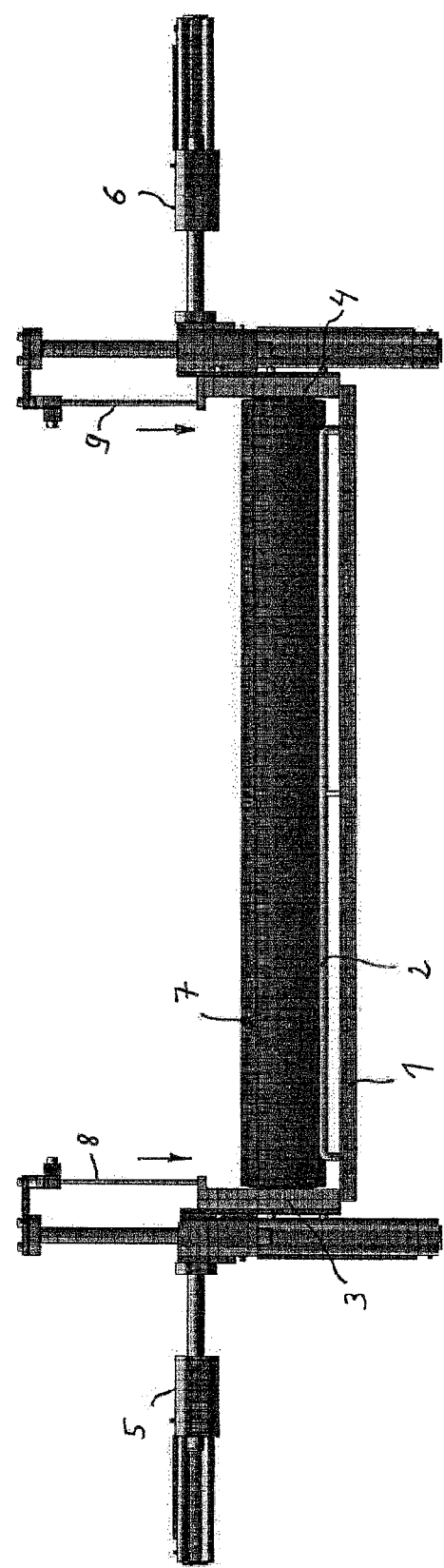
Figure 3:
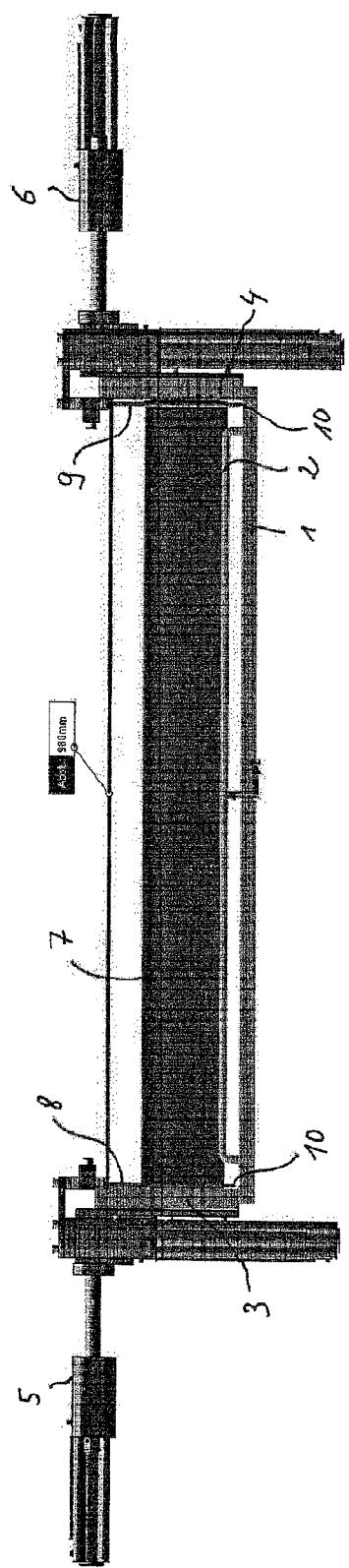
Figure 4:
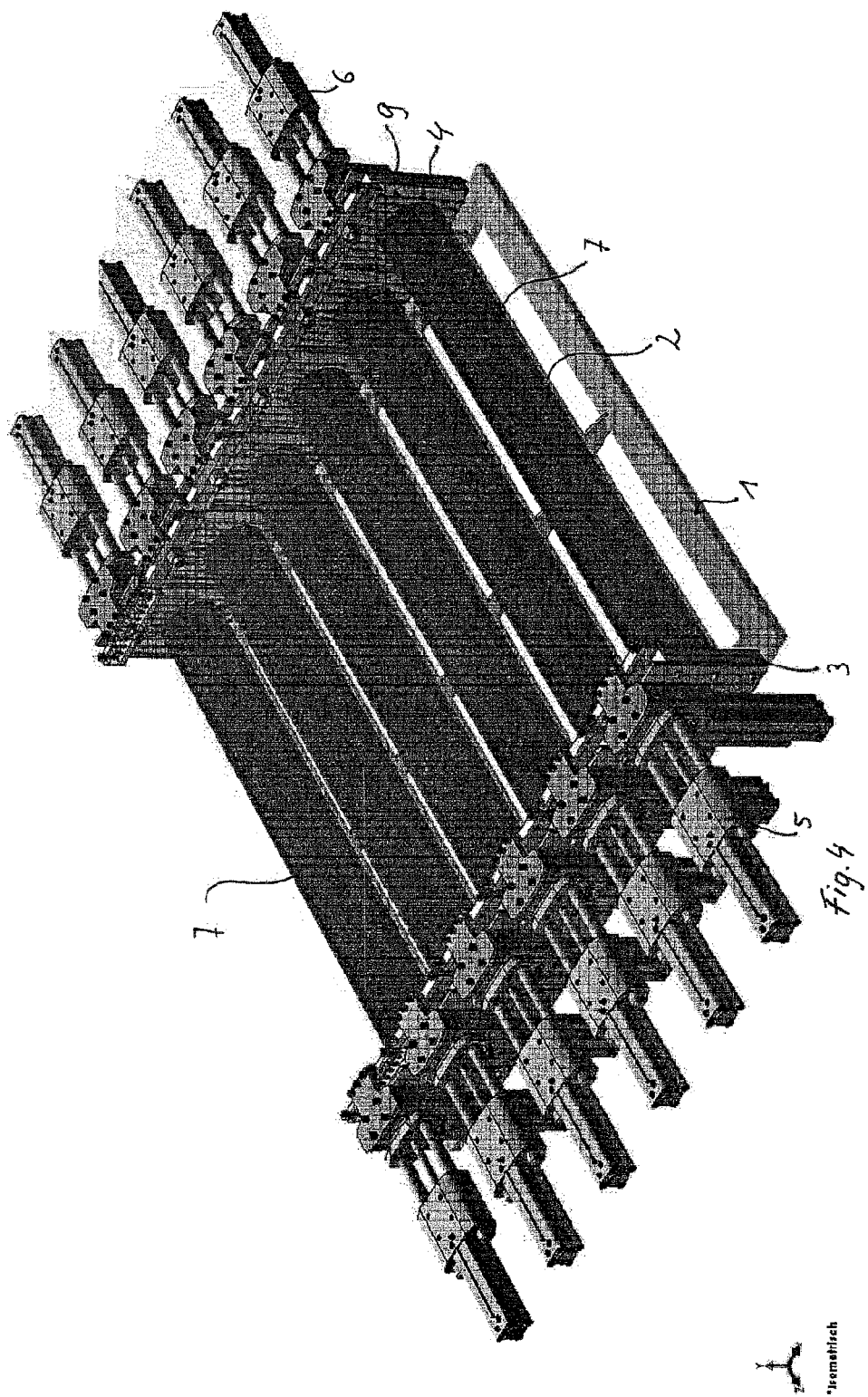
Figure 5:
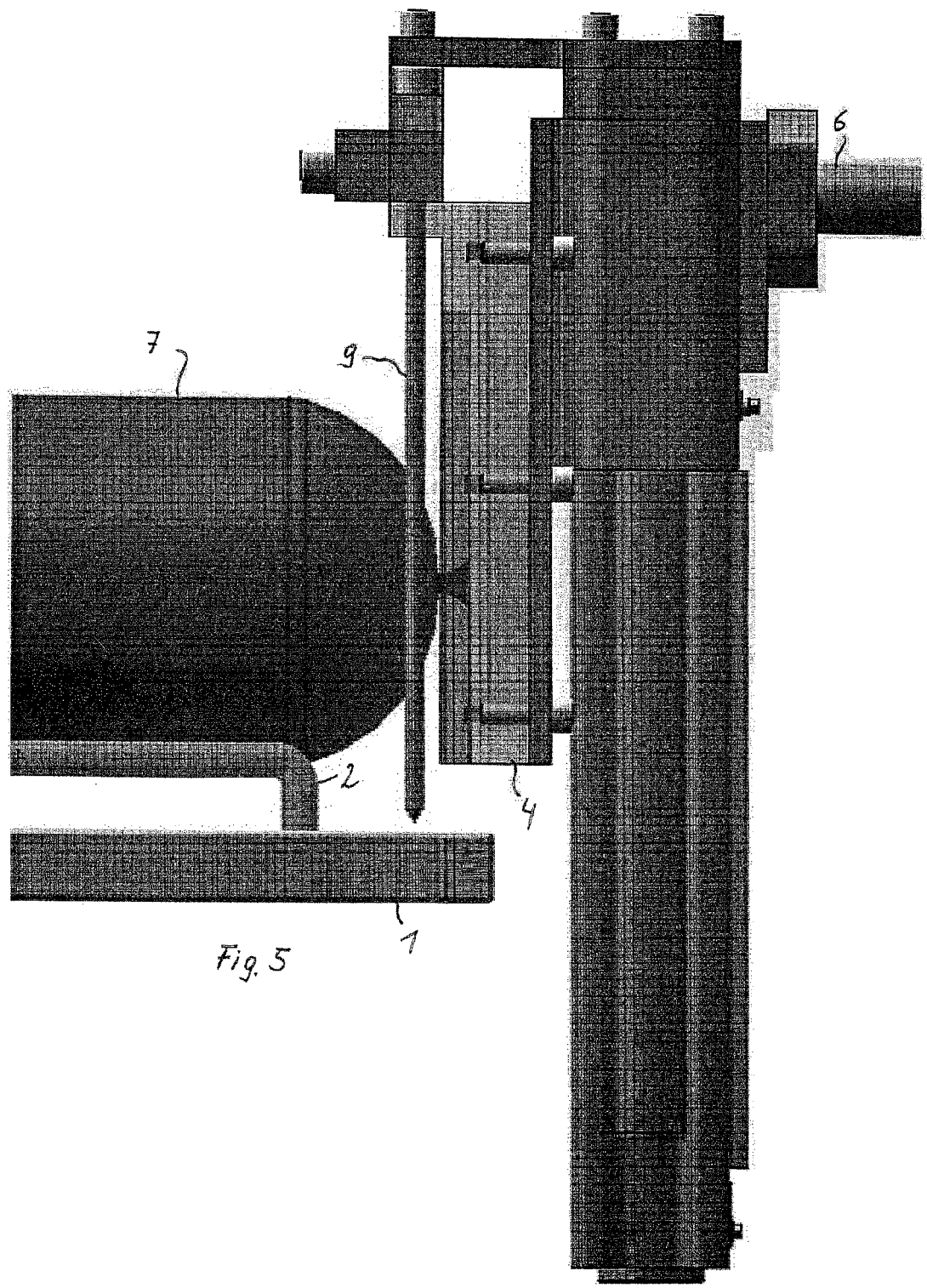
Figure 6:
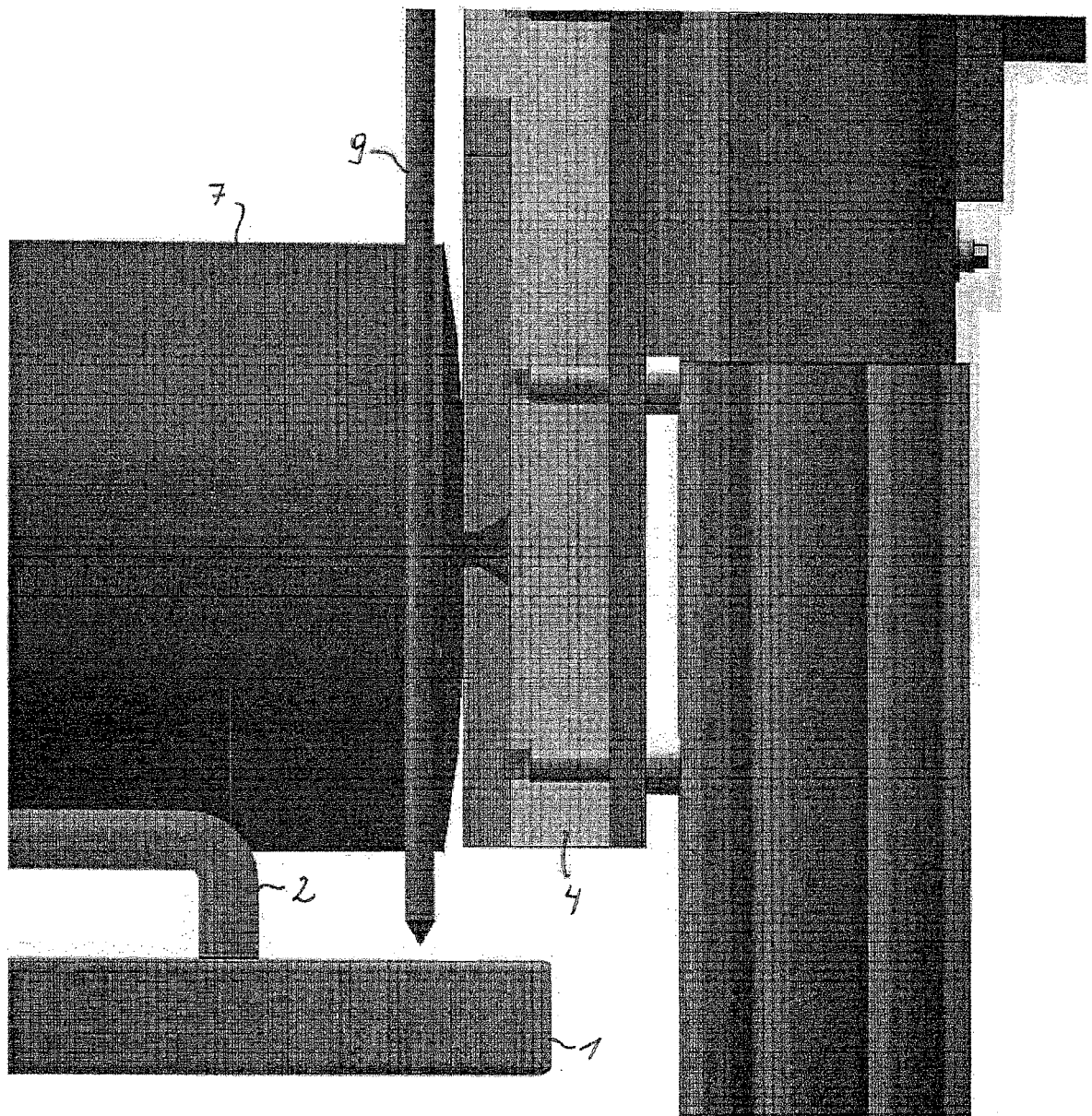

Shown are in:

FIG. 1 a side view of a device according to the invention for receiving a sausage product already present in a casing, in a first state without compaction in the longitudinal direction of the sausage product;

FIG. 2 a representation similar to that of FIG. 1 but with a compaction movement already executed by lateral plates, which at the same time serve the purpose of guiding the electrodes so that the formation of undesired caps in the end areas of the sausage product may be avoided;

FIG. 3 a representation similar to that of FIG. 2 but after a performed entry and penetration movement of the electrodes through the envelope and the very sausage product to be treated;

FIG. 4 a perspective view of a device according to the representations of FIGS. 1 to 3 for simultaneously treating a plurality of sausage products present in a casing, in particular in treating scalded sausage;

FIG. 5 a detailed representation in a side view of the device according to the invention for receiving a sausage product already present in a casing, in a state with a recognizable penetration electrode without compaction in the longitudinal direction of the sausage product; and FIG. 6 a representation similar to that of FIG. 5 but as a result of compaction in the longitudinal direction.

The device for executing the method and shown in the Figures by way of example is composed of a rack 1 having guiding trays 2.

Each of a pair of spaced-apart guiding trays 2 receives a scalded sausage present in a casing.

A supporting frame, which is not shown, receives opposing spaced-apart plates 3 and 4.

A driving mechanism 5; 6 creates the possibility of moving the plates 3; 4 toward each other, so that a compaction of the scalded sausage may be realized at its ends as is illustrated by the sequence of FIGS. 1 and 2 or 5 and 6, respectively.

When the desired frontal compaction of the scalded sausage 7 has been reached, the first 8 and second 9 electrode group, each of which comprises a comb-like set of needles (see FIGS. 4 and 6), is moved downward in the direction of the arrow, so that the desired process of piercing the scalded sausage 7 may be performed.

As illustrated in FIG. 3, this piercing is implemented such that the tips 10 of the electrodes of the comb-like set of needles exit again from the foodstuffs to be treated, that is to say the scalded sausage 7. As compared to the solutions of the state of the art, not only a pricking but also a piercing through thus takes place in relation to the product.

In the shown example, the needle electrodes of the electrode groups 8; 9 are pierced through the product 7 to be treated essentially perpendicular to the longitudinal axis thereof. This kind of piercing has shown to be particularly advantageous. Of course, it is within the spirit of the invention to deviate from the perpendicular direction of piercing.

The advantage of the electrode groups employed according to the invention and having electrodes of a comb-like set of needles is that, as compared to extensive electrodes, disturbing insulating gaps may not develop, for example, due to gas formation or gas accumulations. The result is a particularly uniform and more rapid heating without any hot spots of the material to be treated.

The number of the electrodes of comb-like set of needles of the corresponding needle comb may be in the range from five to fifteen, for example, and may be adapted or matched to the diameter of the material to be treated.

The invention claimed is:

1. A method for treating food which is in an insulating encapsulation or casing, by means of ohmic heating, for heating food products present in the insulating encapsulation or the casing, wherein the respective food is brought into contact with spaced electrically conductive electrodes, and the electrodes are connected to a controllable or regulatable current source, characterized in that the electrodes are each in the form of at least one first and one second electrode group, wherein the electrode groups are at a first distance to one another, each electrode group has a number of individual electrodes, similar to a comb-like set of needles, wherein the neighboring individual electrodes of the comb-like set of needles are each at a second distance to one another, furthermore, the first distance is greater than or equal to the second distance, and the respective comb-like set of needles is arranged to pierce and penetrate the insulating encapsulation or the casing and to pierce the food or is moved to pierce through the food in such a way that entry and exit points of the comb-like set of needles are formed in relation to the food and the insulating encapsulation or casing.

2. The method according to claim 1, characterized in that the individual electrodes of the comb-like set of needles are realized to be substantially in parallel to one another, and each individual electrode has a puncture sharpening, wherein the current source is only activated when all of or the vast majority of the individual electrodes have reached their exit point end position.

3. The method according to claim 1, characterized in that
in case of a sausage product present in a flexible natural casing, the respective electrode group is entered in the tail area of the natural casing, and a corresponding puncture is produced there, wherein an at least end-side compaction occurs by means of exerting a pressing force in the longitudinal direction of the sausage product, and a cap formation at the natural casing ends is reduced.

4. The method according to claim 1, characterized in that
after the removal of the respective electrode groups from the treated foodstuff by the action of tensile or compressive force, the remaining entry or passage points are closed.

5. The method according to claim 4, characterized in that
closing may be performed by spraying, by gluing, coating or enclosing.

6. The method according to claim 4, characterized in that
re-stretching, self-repairing film materials are used for closing, or the casing material itself has at least sections of a re-stretching, self-repairing material.

7. The method according to claim 1, characterized in that
the current source provides high-frequency energy, wherein the ohmic heating may at least be performed until the respective foodstuff coagulates.

8. The method according to claim 1, characterized in that
reheating is executed on a conventional basis.

9. The method according to claim 1, characterized in that
the individual electrodes are movable or rotatable about their axes and execute a rotational movement during the piercing process, wherein a rotational movement in a respectively changed direction takes place during the removal of the individual electrodes.

10. The method according to claim 1, characterized in that
the individual electrodes are formed as hollow electrodes, and the hollow electrode space accommodates or conducts a tempering agent/cooling agent.

11. The method according to claim 1, characterized in that
the insulating encapsulation is at least in part configured to be rigid and has openings through which the individual electrodes penetrate, get into contact with the material of foodstuff to be treated and pierce it.

12. The method according to claim 1, characterized in that
the individual electrodes are introduced such that a grid electrode is formed in at least one electrode group.

13. The method according to claim 1, characterized in that
the insulating encapsulation is composed of half shells receiving the foodstuff, wherein the half shells will be moved toward one another to constitute a mold prior to the intrusion of the electrodes with respect to the foodstuff.

14. The method according to claim 1, characterized in that
penetrating or piercing through is performed in an ultrasonic-assisted manner.

15. The method according to claim 1, characterized in that
a post-treatment by means of conventional heat treatment, in particular infrared radiation, is performed at least in edge areas of the material to be treated.

16. The method according to claim 1, characterized in that
the electrodes are arranged such that energizing and heating only occurs in partial sections of the material to be treated.

17. The method according to claim 1, characterized in that
energizing and heating are performed in a stepwise manner with intermediary stop times.

18. The method according to claim 1, characterized in that
at least one of the electrodes has an integrated temperature sensor.

19. The method according to claim 1, characterized in that
the electrodes are made of a conductive plastic material.

20. The method according to claim 1, characterized in that
the conductivity of the electrodes is adjustable.

21. The method according to claim 20, characterized in that
the conductivity of the electrodes is adjustable to be different from electrode to electrode.

22. The method according to claim 1, characterized in that
in addition, or as an alternative, at least one electrode group is formed as a gas-permeable cap electrode or flat electrode which merely touches the material to be treated in a contacting manner.

23. The method according to claim 1, characterized in that,
for obtaining desired geometries, a water-permeable and current-permeable mold or membrane is introduced between the material to be treated and heated and a resistance-adjusted buffer material.

24. The method according to claim 1, characterized in that,
the food product is one of a sausage product, a scalded sausage and a hot dog.

* * * * *